United States Patent [19]
Umetsu

[11] Patent Number: 5,751,963
[45] Date of Patent: May 12, 1998

[54] HIERARCHICAL NETWORK MANAGEMENT SYSTEM OPERATING AS A PROXY AGENT FOR ENHANCING PROCESSING EFFICIENCY

[75] Inventor: Minoru Umetsu, Tokyo, Japan

[73] Assignee: Mitsubishi Denki Kabushiki Kaisha, Tokyo, Japan

[21] Appl. No.: 730,795

[22] Filed: Oct. 16, 1996

[30] Foreign Application Priority Data

Mar. 29, 1996 [JP] Japan ................... 8-076886

[51] Int. Cl.[6] ................... G06F 11/30
[52] U.S. Cl. ................... 395/200.53; 395/200.54; 395/200.63
[58] Field of Search ................... 395/200.53, 200.54, 395/200.63

[56] References Cited

U.S. PATENT DOCUMENTS

| | | | |
|---|---|---|---|
| 5,333,308 | 7/1994 | Ananthanpillai | 395/182.02 |
| 5,359,602 | 10/1994 | Diaz et al. | 370/401 |
| 5,440,719 | 8/1995 | Hanes et al. | 395/500 |
| 5,500,944 | 3/1996 | Yoshida | 395/184.01 |
| 5,544,154 | 8/1996 | Glitho | 370/17 |

FOREIGN PATENT DOCUMENTS

| | | |
|---|---|---|
| 63-13542 | 1/1988 | Japan. |
| 4-349800 | 12/1992 | Japan. |
| 5-216842 | 8/1993 | Japan. |
| 6-14371 | 1/1994 | Japan. |
| 6-311172 | 10/1994 | Japan. |
| 6-334657 | 12/1994 | Japan. |

*Primary Examiner*—Krisna Lim
*Attorney, Agent, or Firm*—Sughrue, Mion, Zinn, Macpeak & Seas, PLLC

[57] ABSTRACT

In a network management system comprising a plurality of manager nodes and a proxy agent node for managing network resources, an efficient network management apparatus is provided for calculating a network load, automatically adjusting monitor traffic occurrence intervals in response to the load totalizing inquiries from the managers and preventing duplicate inquiry handling, and caching the inquiry result for suppressing access to the network resources. The management traffic occurrence frequency is automatically optimized in response to the network load and essential application communication performance is prevented from lowering for enhancing processing efficiency.

6 Claims, 10 Drawing Sheets

| | 30 | 31 | 32 | 33 |
|---|---|---|---|---|
| | INQUIRY CODE | RESOURCE CODE | SET DATA | INQUIRER |

| 40 | 41 | 42 | 43 | 44 | 45 |
|---|---|---|---|---|---|
| INQUIRY CODE | RESOURCE CODE | SET DATA | INQUIRER LIST ADDRESS | CACHE BUFFER ADDRESS | TIME STAMP |
| Get | nodeScanMax | | 0xD100 | 0xE100 | 10:30:25 |
| Get | nodeBatteryErr | | 0xD200 | 0xE200 | 10:32:50 |
| Set | segScanThr | 100 | 0xD300 | 0xE300 | 10:55:10 |

５,７５１,９６３

HIERARCHICAL NETWORK MANAGEMENT SYSTEM OPERATING AS A PROXY AGENT FOR ENHANCING PROCESSING EFFICIENCY

BACKGROUND OF THE INVENTION

This invention relates to a network management system in a hierarchical network and in particular to a network management apparatus for connecting network domains having different protocols and operating as a proxy agent of subordinate networks.

Generally, a proxy agent node in a hierarchical network monitors resources in a subordinate network periodically at given monitor intervals and when noticing a fault or change, issues an event to superior manager nodes as a notification.

When receiving an inquiry about the resource state in a subordinate network from a manager node, immediately the proxy agent node accesses the resources in the subordinate network and returns the accessed data to the requesting manager node.

FIG. 15 shows a general configuration of a network management system in a hierarchical network, wherein numeral 1 is a proxy agent node, numeral 2 is a manager node, numeral 3 is resources in a subordinate network (a data base containing fault information, configuration information, performance information, job information, etc., for each node), numeral 4 is a superior network, and numeral 5 is a subordinate network.

FIG. 14 is a block diagram of a conventional proxy agent node in such a hierarchical network, wherein numeral 1 is a proxy agent node, numeral 10 is a resource state monitor section for accessing network resources periodically in a cycle of one setup monitor interval time and monitoring the state of fault, etc.; numeral 12 is an inquiry handling section for receiving a resource state inquiry from a manager node 2 and returning the resource state in the subordinate network thereto, numeral 14 is an application task for accessing the resources 3 and executing a normal application, numeral 15 is monitor interval time, numeral 17 is a superior communication control section for controlling communication with the manager nodes 2, numeral 18 is a superior transmission queue for temporarily holding transmission data 18-a to the manager nodes 2, numeral 19 is a superior reception queue for temporarily holding reception data 19-a from the manager nodes 2, numeral 20 is a subordinate communication control section for controlling communication with the resources in the subordinate network, numeral 21 is a subordinate transmission queue for temporarily holding transmission data 21-a to the resources 3, and numeral 22 is a subordinate reception queue for temporarily holding reception data 22-a from the resources 3.

The operation of the conventional apparatus having the configuration described above will be discussed.

In state monitor of the resources 3 in the subordinate network, the resource state monitor section 10 passes a request for accessing the resources 3 in the subordinate network to the subordinate communication control section 20 in a cycle indicated in the monitor interval time 15. The subordinate communication control section 20 stores the received access request in the subordinate transmission queue 21 and as soon as it is ready for transmission, transmits the request to the subordinate network 5. When receiving a response to the request for accessing the resources 3, the subordinate communication control section 20 stores the request in the subordinate reception queue 22, then returns response data 22-a to the requester (in this case, the resource state monitor section 10). The resource state monitor section 10 checks the reception data. If it notices a fault or change in the resources 3, the resource state monitor section 10 passes an event notification sent to the manager nodes 2 indicating the fault or change to the superior communication control section 17. The superior communication control section 17 stores the received event notification in the superior transmission queue 18 and as soon as it is ready for transmission, transmits the event notification to the manager nodes 2 in the superior network 4.

Next, in a resource state inquiry in the subordinate network from a manager node, when receiving an inquiry from the manager node 2, the superior communication control section 17 stores the inquiry in the superior reception queue 19, then passes inquiry data 19-a to the inquiry handling section 12. Immediately the inquiry handling section 12 analyzes the contents of the inquiry and passes a request for accessing the corresponding resources 3 to the subordinate communication control section 20. The subordinate communication control section 20 stores the received access request in the subordinate transmission queue 21 and as soon as it is ready for transmission, transmits the access request to the subordinate network 5. When receiving a response from the resources 3, the subordinate communication control section 20 stores the response in the subordinate reception queue 22, then returns response data 22-a to the requester (in this case, the inquiry handling section 12). The inquiry handling section 12 converts the reception data into inquiry answer data and passes the answer to the superior communication control section 17. The superior communication control section 17 once stores the received answer in the superior transmission queue 18 and as soon as it is ready for transmission, transmits the answer to the inquiring manager node 2 in the superior network 4.

Next, in application access to the resources 3 from an application task 14, the application task 14 passes a request for accessing the corresponding resources 3 to the subordinate communication control section 20. The subordinate communication control section 20 stores the received access request in the subordinate transmission queue 21 and as soon as it is ready for transmission, transmits the access request to the subordinate network 5. When receiving a response from the resources 3, the subordinate communication control section 20 stores the response in the subordinate reception queue 22, then returns response data 22-a to the requester (in this case, the application task).

In every case, the resource state monitor section 10 and the inquiry handling section 12 perform processing without considering a load in the subordinate network 5 or a communication load in the proxy agent 1.

Since the conventional proxy agent node in the hierarchical network is configured as discussed above, the resources are accessed independently of the subordinate network load which increases, and furthermore a high load condition is produced, lowering application communication performance required essentially for the subordinate network.

If an access request for monitoring the resources from the resource state monitor section and access requests responding to resource state inquiries from a plurality of manager nodes occur like a burst in a condition in which the proxy agent node also has an application task and communicates with a node in the subordinate network, the communication performance of the application task is lowered.

SUMMARY OF THE INVENTION

It is therefore an object of the invention to provide a network management apparatus for preventing network management traffic from causing essential application communication performance to lower.

According to the invention, there is provided a network management apparatus comprising resource state monitor means for accessing network resources periodically in a cycle of one setup monitor interval time and monitoring a state of fault, etc., means for finding a current utilization factor from an arrival factor of accessing the resources and an average response time to access, means for finding a length of a transmission queue for accessing the resources, and automatic monitor interval time change means for calculating monitor interval time not causing essential application communication performance to lower from the current utilization factor and the queue length found and automatically changing the monitor interval time.

When resources are accessed every monitor interval time in the network management apparatus, if the length of the transmission queue exceeds one length (maximum queue length), if the current monitor interval time exceeds the upper limit of the monitor interval time (maximum monitor interval time), or if the current utilization factor exceeds the upper limit of the utilization factor (maximum utilization factor), the resource state monitor means cancels the access.

The network management apparatus further includes inquiry handling means for accepting a resource state inquiry in a subordinate network from a manager node and returning the resource state thereto. When the resources are accessed, if the length of the transmission queue exceeds one length (maximum queue length), if the current monitor interval time exceeds the upper limit of the monitor interval time (maximum monitor interval time), or if the current utilization factor exceeds the upper limit of the utilization factor (maximum utilization factor), the inquiry handling means notifies the requesting manager node of an event indicating a high network load.

According to the invention, there is provided a network management apparatus comprising inquiry totalization means for periodically checking a reception queue for temporarily storing resource state inquiries in a subordinate network from manager nodes and totalizing the inquiries stored in the reception queue for each type and duplicate inquiry handling means for completing duplicate inquiries in one processing.

According to the invention, there is provided a network management apparatus comprising inquiry totalization means for periodically checking a reception queue for temporarily storing resource state inquiries from the manager nodes and totalizing the inquiries stored in the reception queue for each type and inquiry cache handling means for holding resource state data provided by accessing the resources in response to an inquiry in a cache buffer for each type of totalized inquiries for a fixed time period. If the same inquiry is made meanwhile, the inquiry cache handling means returns the resource state data held in the cache buffer without accessing the resources.

DETAILED DESCRIPTION OF THE PREFERRED EMBODIMENTS

Referring now to the accompanying drawings, there is shown one preferred embodiment of the invention.

Figure 1:
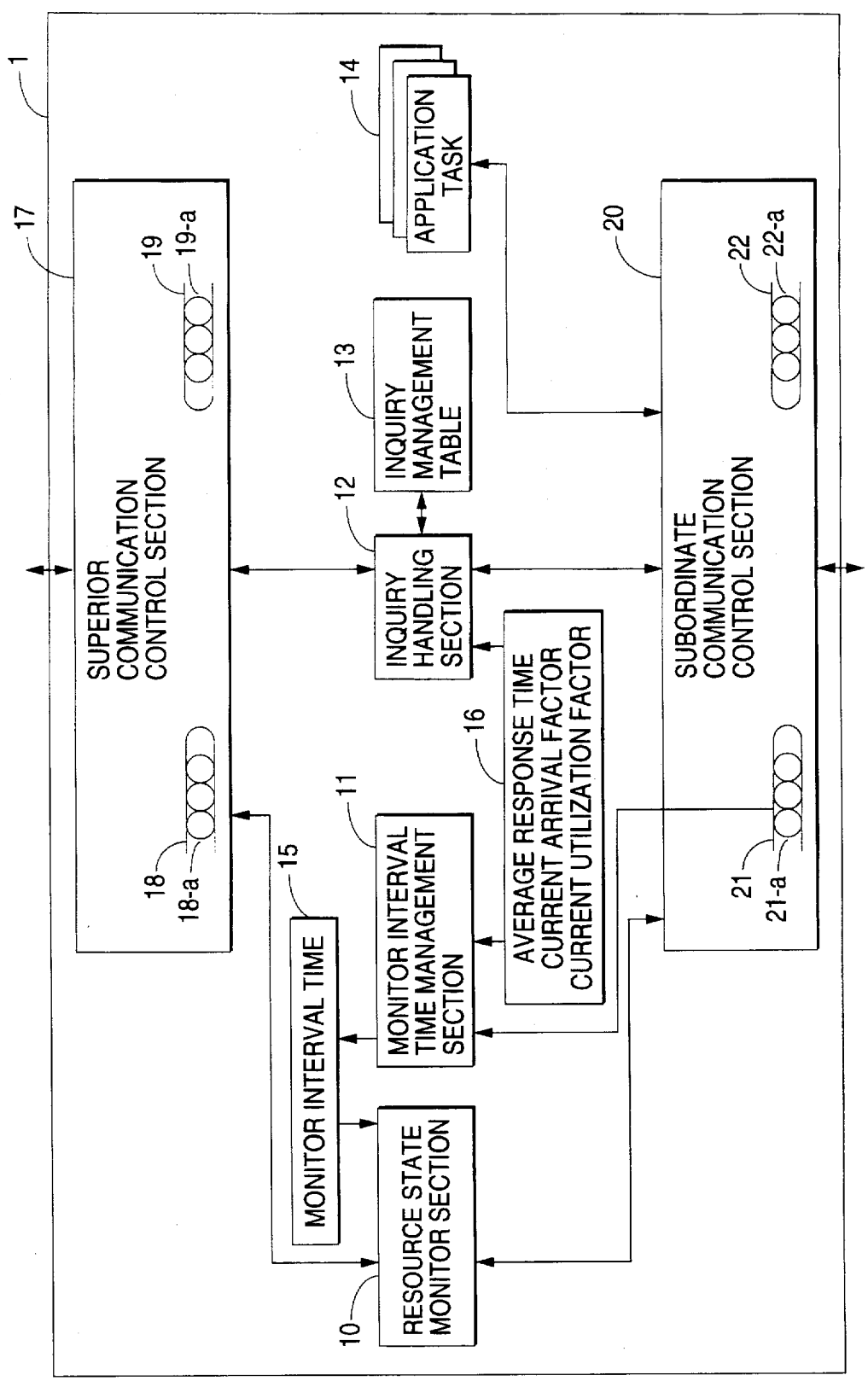
FIG. 1 is a block diagram of a network management apparatus according to one embodiment of the invention.

FIG. 1 is a block diagram to show the configuration of a network management apparatus according to one embodiment of the invention. In the figure, numeral 1 is a proxy agent node, numeral 10 is a resource state monitor section for accessing resources in a subordinate network periodically and monitoring the state of fault, configuration change etc., by network resource state monitor means, numeral 11 is a monitor interval time management section having automatic monitor interval time change means, numeral 12 is an inquiry handling section for handling inquiries from manager nodes by inquiry totalization means, duplicate inquiry handling means, and inquiry cache handling means, numeral 13 is an inquiry management table for totalizing inquiries from manager nodes, numeral 14 is an application task for accessing the resources and executing a normal application, numeral 15 is a monitor interval time memory for storing the current monitor interval time, numeral 16 is a network load information memory for storing the average response time, the current arrival factor, and the current utilization factor, numeral 17 is a superior communication control section for controlling communication with manager nodes, numeral 18 is a superior transmission queue for temporarily holding transmission data 18-a to manager nodes, numeral 19 is a superior reception queue for temporarily holding reception data 19-a from manager nodes, numeral 20 is a subordinate communication control section for controlling communication with the resources in the subordinate network, numeral 21 is a subordinate transmission queue for temporarily holding transmission data 21-a to the resources, and numeral 22 is a subordinate reception queue for temporarily holding a response to a request for accessing the resources (reception data 22-a).

Figures 2, 3:
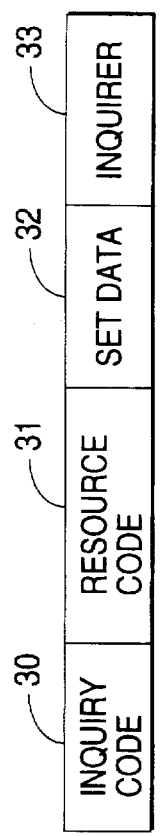
FIG. 2 is an illustration to show a message format of a network resource state inquiry from a manager node.
FIG. 3 is an illustration to show a format example of an inquiry management table in the network management apparatus according to the embodiment of the invention.

FIG. 2 is an illustration to show a message format of a resource state inquiry from a manager node. In the figure, numeral 30 is a code indicating a resource state inquiry, numeral 31 is a code of resources in the subordinate network about which an inquiry is to be made, numeral 32 is write data for a write inquiry into resources, and numeral 33 is the name of an inquirer.

FIG. 3 is an illustration to show a format example of an inquiry management table in the network management apparatus according to the embodiment of the invention. In the figure, numeral 40 is a field indicating inquiry codes in the management table, numeral 41 is a field indicating codes of resources about which an inquiry is to be made, and numeral 42 is a field indicating write data when the inquiry is a write inquiry into resources, which is not used for read inquiries. Numeral 43 is a field indicating addresses of lists in which inquirer names are recorded when the same inquiry is made from a plurality of managers, numeral 44 is a field indicating addresses of cache buffers for storing accessed and gotten resource state data, and numeral 45 is a field indicating the time of day at which the resource state data was accessed and gotten.

Figure 4:
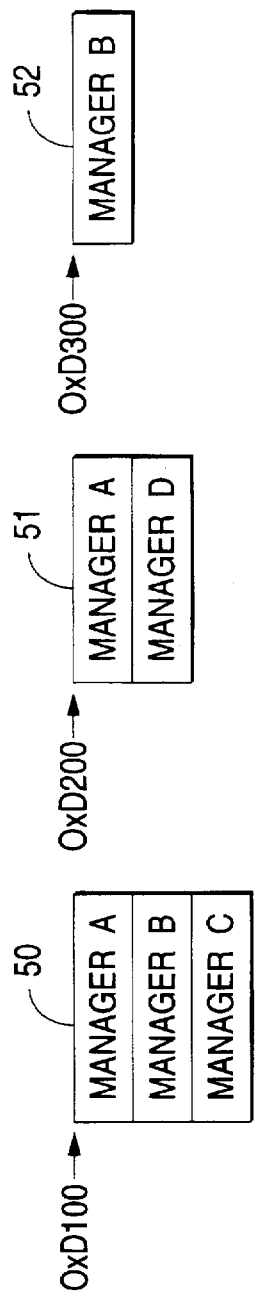
FIG. 4 is an illustration to show a configuration example of inquirer lists pointed to by the inquirer list address field in the inquiry management table in FIG. 3.

FIG. 4 shows a configuration example of the inquirer lists pointed to by the inquirer list address field in the inquiry management table in FIG. 3. In the figure, numerals 50, 51, and 52 are inquirer lists liked with the first, second, and third records in the example in FIG. 3 respectively.

Figure 5:
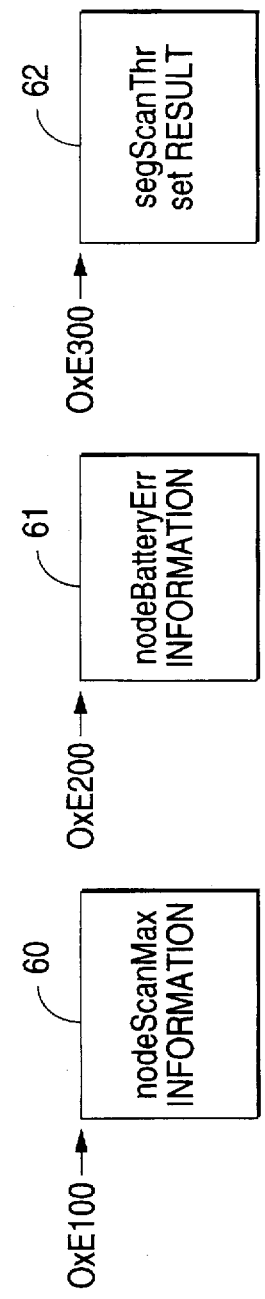
FIG. 5 is an illustration to show a configuration example of cache buffers pointed to by the cache buffer address field in the inquiry management table in FIG. 3.

FIG. 5 shows a configuration example of the cache buffers pointed to by the cache buffer address field in the inquiry management table in FIG. 3. In the figurer numerals 60, 61, and 62 are cache buffers liked with the first, second, and third records in the example in FIG. 3 respectively.

Figure 6:
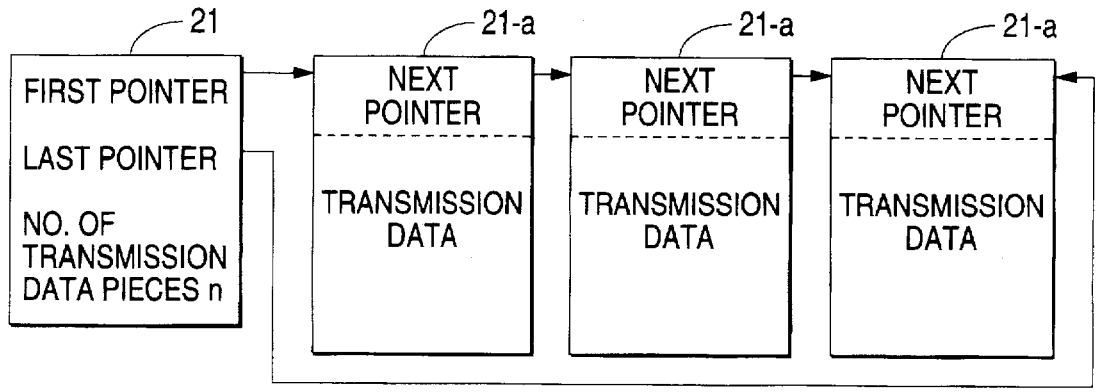
FIG. 6 is an illustration to show the configuration of a subordinate transmission queue in a general network management apparatus.

FIG. 6 is an illustration to show the configuration of a subordinate transmission queue in a general network management apparatus. In the figure, numeral 21 is a header part of the subordinate transmission queue for managing transmission data 21-a and comprises a pointer to the first transmission data, a pointer to the last transmission data, and a variable indicating the number of transmission data pieces stored in the subordinate transmission queue.

Calculation procedures of network load information (average response time, current arrival factor, and current utilization factor) in the subordinate communication control section 20 in the configuration as described above will be discussed with reference to FIGS. 7 to 9.

When accepting a resources access request from the resource state monitor section 10, the inquiry handling section 12, or the application task 14, when receiving a response to access to the resources 3, or when a periodic timer interrupt for network load information calculation occurs, the subordinate communication control section 20 is started.

Figure 7:
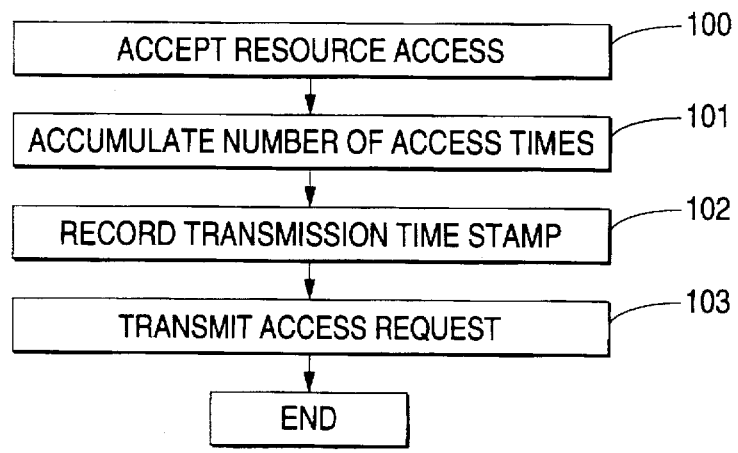
FIG. 7 is a flowchart to show a processing flow of a subordinate communication control section in the network management apparatus according to the embodiment of the invention.

In FIG. 7, when a request for accessing the resources 3 is accepted at step 100, a resource access counter is incremented for accumulating the number of access times, and the result is recorded at step 101. Next, the transmission time of day is recorded at step 102 and the access request is transmitted at step 103, then the transmission process is terminated.

Figure 8:
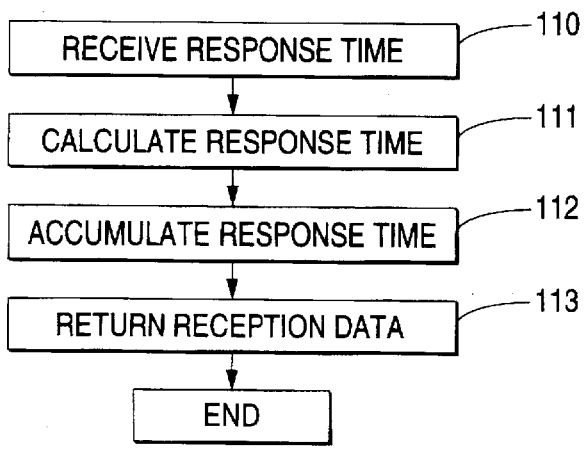
FIG. 8 is a flowchart to show a processing flow of the subordinate communication control section in the network management apparatus according to the embodiment of the invention.

In FIG. 8, when a response to the request for accessing the resources 3 is received at step 110, the response time is found from the difference between the time stamp recorded at step 102 and the reception time of day at step 111, the found response time is added for accumulating the response time and the result is recorded at step 112. The received response data is returned to the resource access requester at step 113 and the response reception process is terminated.

Figure 9:
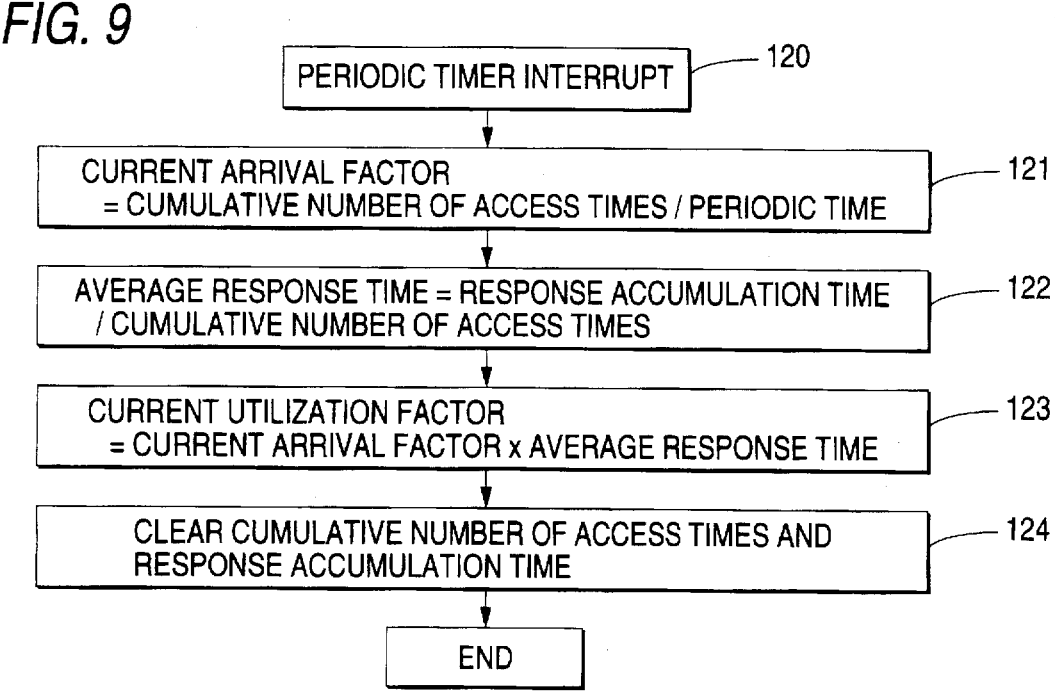
FIG. 9 is a flowchart to show a processing flow of the subordinate communication control section in the network management apparatus according to the embodiment of the invention.

In FIG. 9, when a periodic timer interrupt for network load information calculation occurs at step 120, the current arrival factor is calculated according to a calculation expression shown at step 121, where the cumulative number of access times is the number found at step 101 and the periodic time is the periodic timer interrupt interval time. Next, the average response time is calculated according to a calculation expression shown at step 122, where the response accumulation time is the time found at step 112. Next, the current utilization factor is calculated according to a calculation expression shown at step 123. The calculated average response time, current arrival factor, and current utilization factor are recorded in the network load information memory 16 and the cumulative number of access times and the response accumulation time are cleared at step 124, then the process is terminated.

Figure 10:
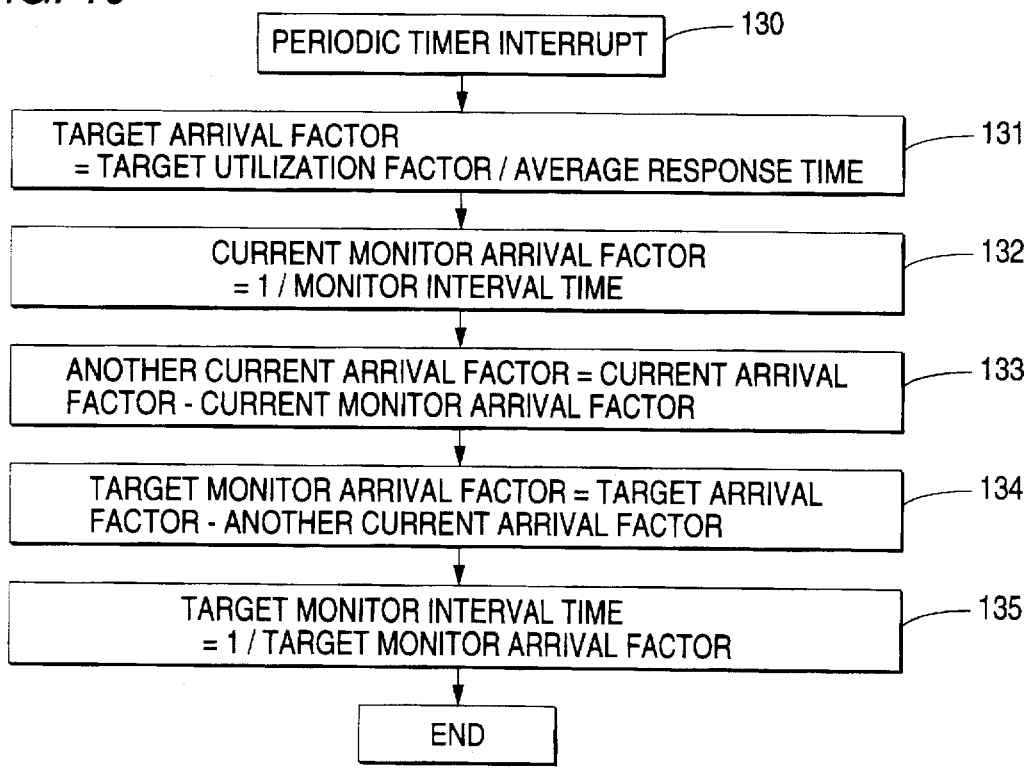
FIG. 10 is a flowchart to show a processing flow of automatic monitor interval time change means based on the average response time and arrival factor in a monitor interval time management section in the network management apparatus according to the embodiment of the invention.

Next, a monitor interval time calculation procedure based on the average response time and the current arrival factor calculated according to the above-mentioned procedure in the monitor interval time management section 11 will be discussed with FIG. 10.

When a periodic timer interrupt for reviewing the monitor interval time occurs at step 130, a target arrival factor for the subordinate communication control section 20 is calculated according to a calculation expression shown at step 131, where the target utilization factor is preset as a system parameter. Next, the current arrival factor for the network resource state monitor section 10 (current monitor arrival factor) is calculated according to a calculation expression shown at step 132. The time set in the monitor interval time memory is used for the monitor interval time. Next, the current monitor arrival factor for the network resource state monitor section 10 is subtracted from the current arrival factor to calculate the current arrival factor for the inquiry handling section 12 and the application task 14 (another current arrival factor) according to a calculation expression shown at step 133. Next, a target arrival factor assigned to the network resource state monitor section 10 in the target arrival factor (target monitor arrival factor) is calculated according to a calculation expression shown at step 134. Next, the monitor interval time of the resource state monitor section 10 to be used in the future (target monitor interval time) is calculated according to a calculation expression shown at step 135.

Figure 11:
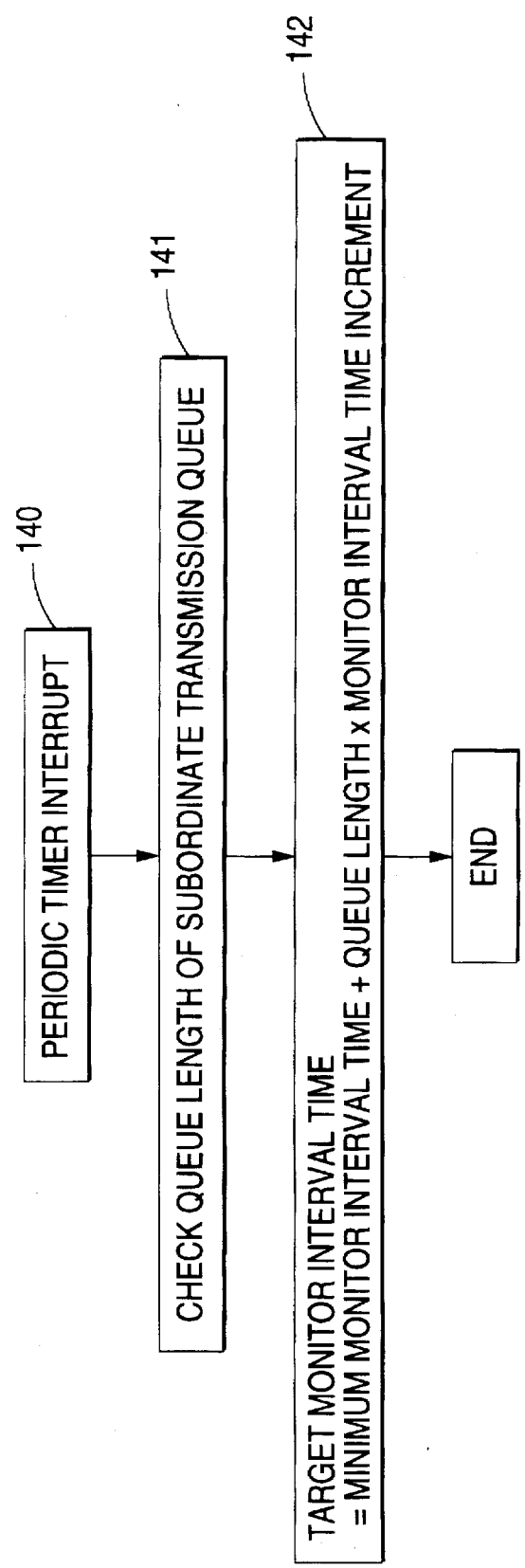
FIG. 11 is a flowchart to show a processing flow of automatic monitor interval time change means based on the queue length in a monitor interval time management section in the network management apparatus according to the embodiment of the invention.

Another monitor interval time calculation procedure based on the queue length will be discussed with reference to FIG. 11.

When a periodic timer interrupt for reviewing the monitor interval time occurs at step 140, the subordinate transmission queue 21 is checked to find the queue length at step 141. The queue length is the total number of entries of transmission data 21-a linked with the subordinate transmission queue 21; it is the value of the variable (n) of the subordinate transmission queue 21. When accepting a request for accessing the resources 3 from the resource state monitor section 10, the inquiry handling section 12, or the application task, the subordinate communication control section 20 adds the accepted access request to the end of the subordinate transmission queue as transmission data 21-a for linking the request and sets the total number of transmission data entries (pieces) in the variable (number of transmission data pieces n) of the subordinate transmission queue 21, as shown in FIG. 6. Next, the target monitor interval time is calculated according to a calculation expression shown at step 142, where the minimum monitor interval time and the monitor interval time increment are preset as system parameters.

The target monitor interval time calculated according to the former procedure or that calculated according to the latter procedure, whichever is the shorter, is set in the monitor interval time stored in the monitor interval time memory 15, and the automatic monitor interval time change process of the monitor interval time management section 11 is terminated.

Figure 12:
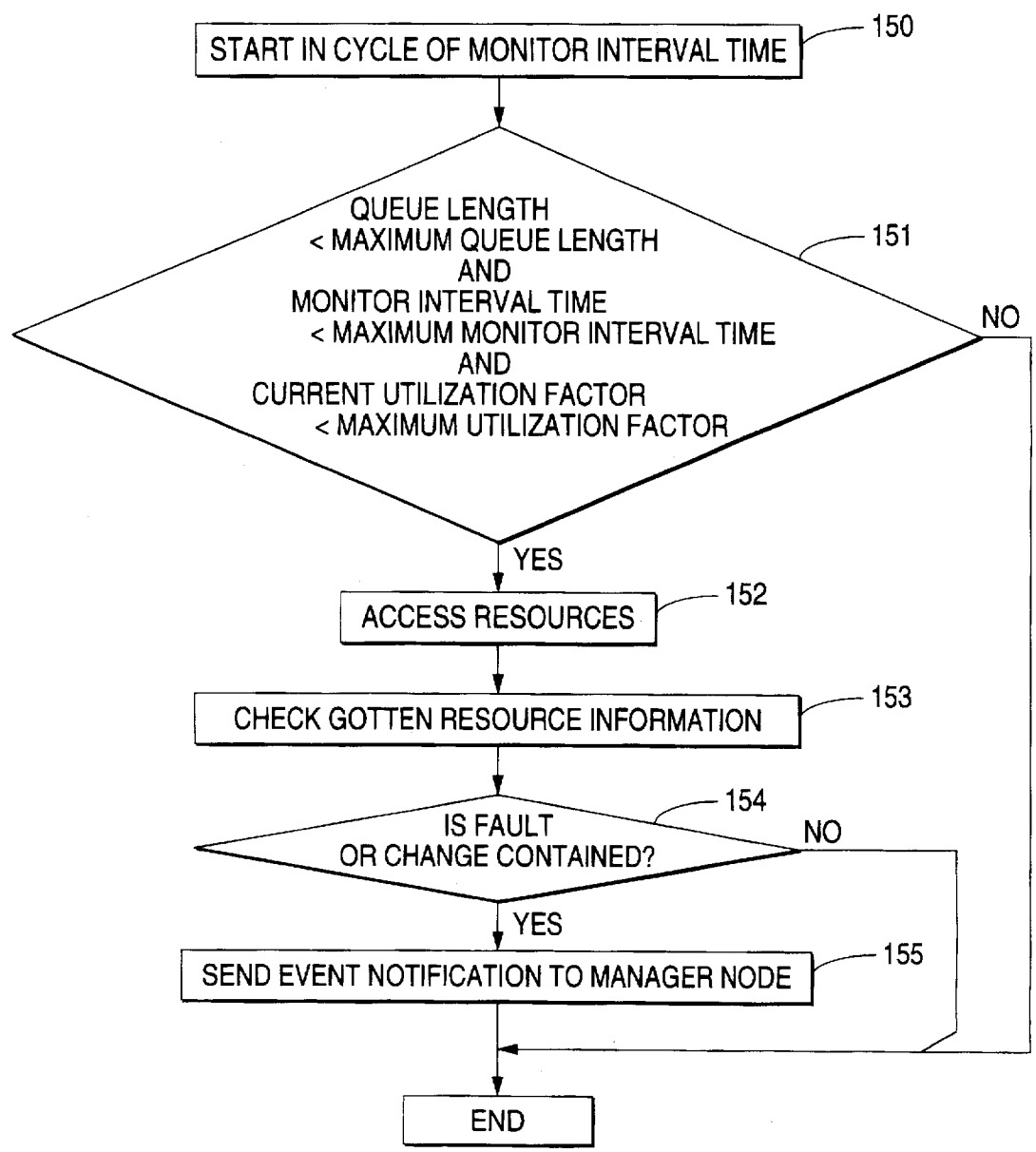
FIG. 12 is a flowchart to show a processing flow of a network resource state monitor section in the network management apparatus according to the embodiment of the invention.

Next, a processing procedure of the resource state monitor section 10 will be discussed with FIG. 12.

Processing of the network resource state monitor section 10 is executed in a cycle of the monitor interval time shown in the monitor interval time memory 15 at step 150. The network is checked for load conditions at step 151. If the queue length indicated in the variable (number of transmission data pieces n) of the subordinate transmission queue 21 is shorter than the maximum queue length and the monitor interval time 15 is shorter than the maximum monitor interval time and the current utilization factor in the network load information memory 16 is smaller than the maximum utilization factor, namely, if all the three conditions are satisfied, control goes to step 152 for performing the same processing as conventional. If not all the conditions are satisfied, the resources 3 are not accessed and the process is terminated.

Figure 13:
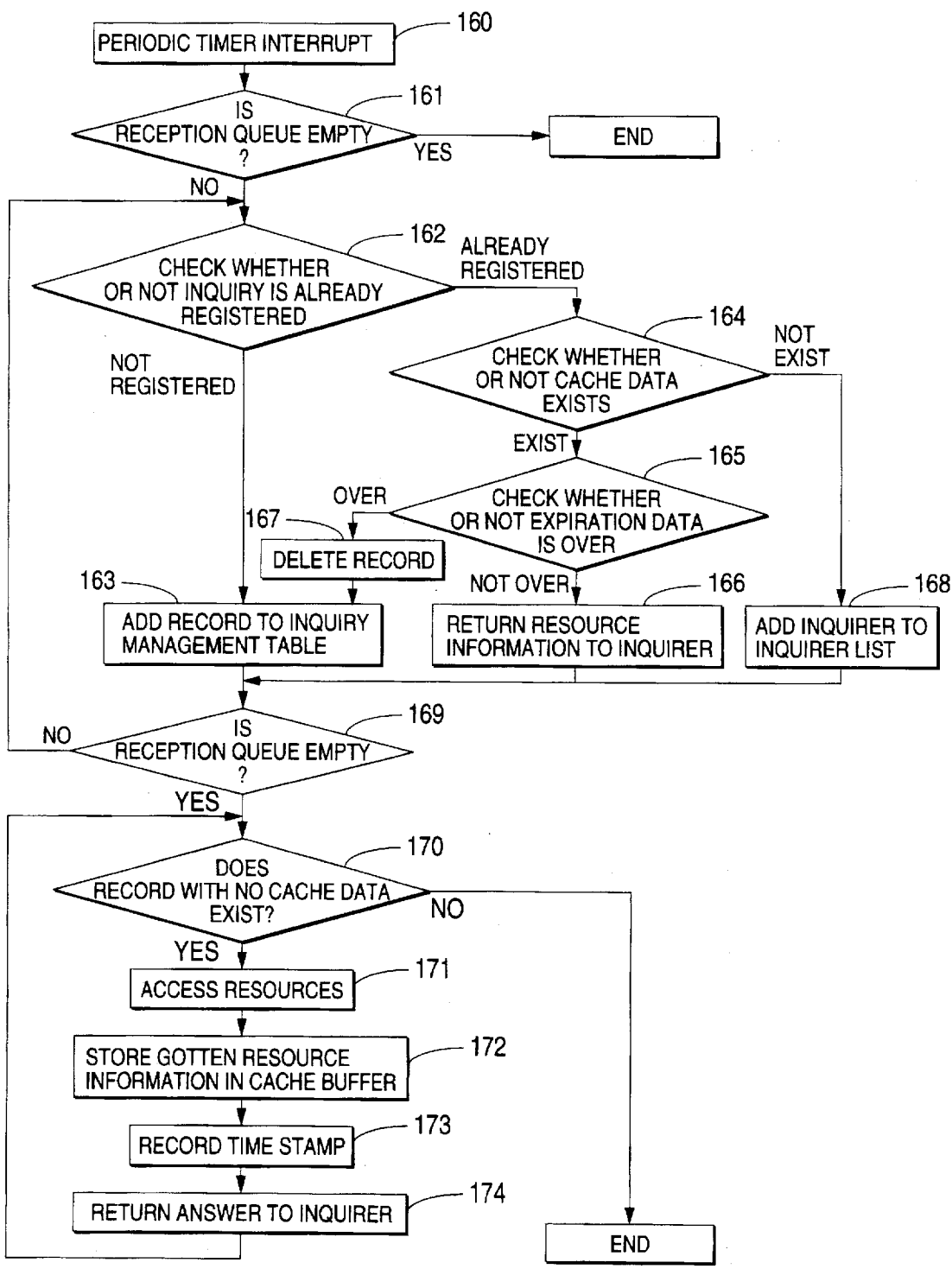
FIG. 13 is a flowchart to show a processing flow of an inquiry management section in the network management apparatus according to the embodiment of the invention.
Figure 14:
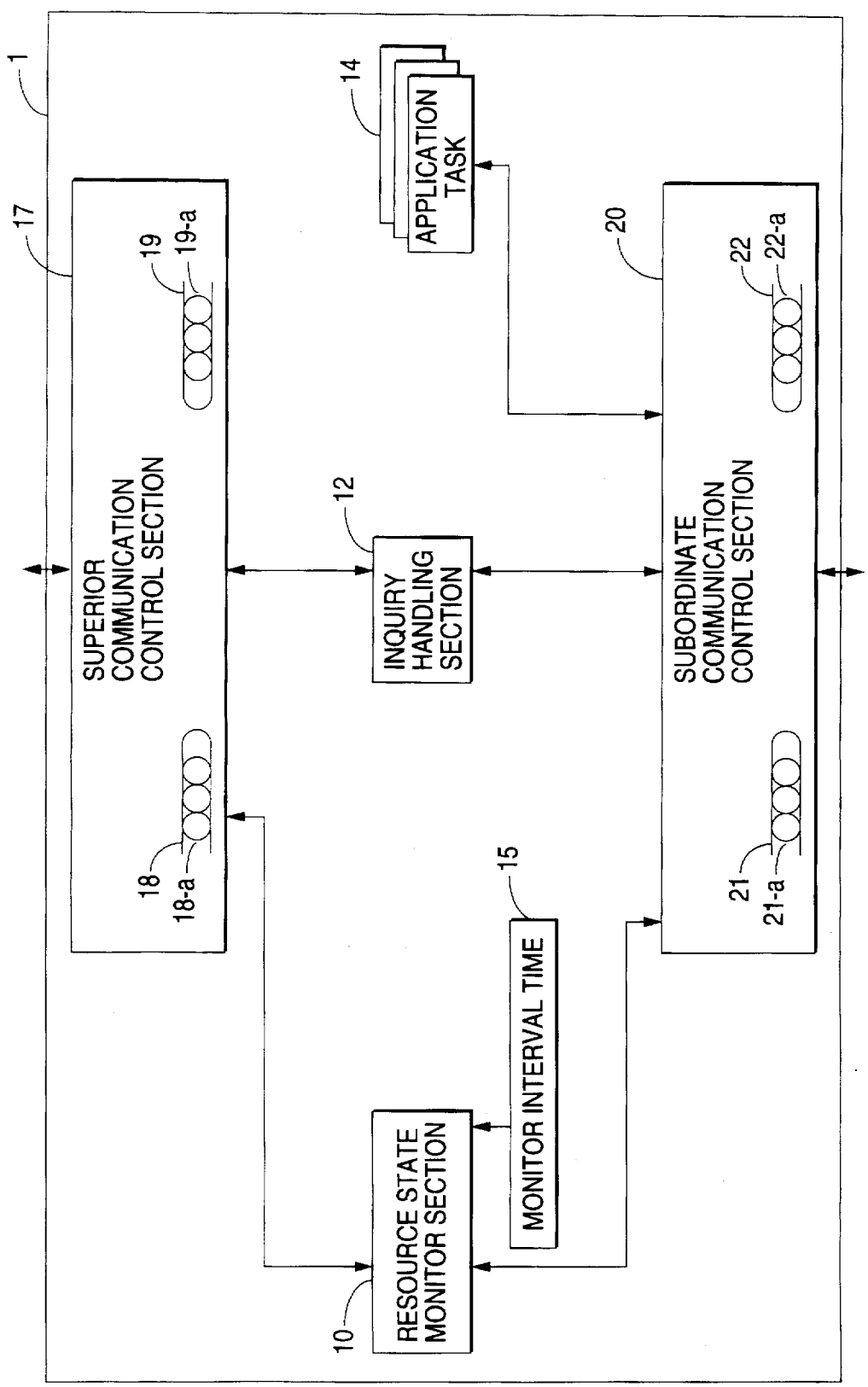
FIG. 14 is a block diagram of a conventional network management apparatus.
Figure 15:
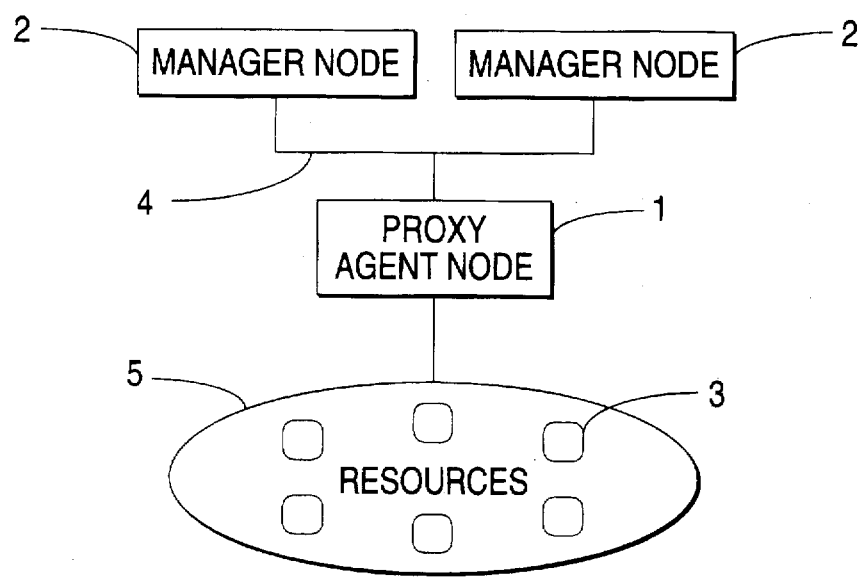
FIG. 15 is a general block diagram of a network management system in a hierarchical network.

Next, a processing procedure of the inquiry handling section 12 will be discussed with reference to FIG. 13.

When a periodic timer interrupt for inquiry handling occurs at step 160, the superior reception queue 19 is checked to see if reception data 19-a exists at step 161. If reception data 19-a exists, it is fetched and control goes to step 162; if not, the process is terminated.

Whether or not the same pair as the pair of the inquiry code 30 and resource code 31 of the fetched reception data 19-a exists in records of the inquiry management table 13 is checked at step 162. If it does not exist, control goes to step 162; if it exists, control goes to step 164.

At step 163, a new record on which the inquiry code 30, resource code 31, and Set data 32 of the reception data is added to the inquiry management table 13, and control goes to step 169.

At step 164, the corresponding record is checked for the cache buffer address field 144. If a cache buffer address is set, control goes to step 165; if not, control goes to step 168. At step 165, the time stamp 45 is checked for cache buffer expiration date. If the expiration date is over, the record is deleted at step 167, and a new record is added at step 163. If the expiration date is not over, the resource information stored in the cache buffer pointed to by the cache buffer address is returned to the inquirer at step 166. At step 168, the inquirer 33 about the fetched reception data 19-a is added to the inquirer list pointed to by the inquirer list address set on the corresponding record, and control goes to step 169.

Whether or not another entry of reception data 19-a exists in the superior reception queue 19 is checked at step 169. If it exists, control returns to step 162 and steps 162-169 are repeated. If the superior reception queue 19 is empty, control goes to step 170.

At step 170, the inquiry management table 13 is checked for the cache buffer address field to see if a record where no address is set, namely, a record with no cache data exists. If the corresponding record exists, control goes to step 171; if not, the process is terminated.

At step 171, a request for accessing the resources 3 corresponding to the found record is passed to the subordinate communication control section 20 according to the same procedure as conventional, and response data 2-a is received. Next, at step 172, a cache buffer is reserved, the network resource information of the response data 22-a is stored therein, and the address of the cache buffer is set in the cache buffer address field 44 of the record. At step 173, the current time of day is recorded in the time stamp field 45 of the record. At step 174, an answer is returned to the inquirer in the inquirer list (50, 51, or 52) pointed to by the inquirer list address field 43 of the record, and the inquirer to which the answer is returned is deleted from the inquirer list, then control returns to step 170. Steps 170 to 174 are repeated until records with no cache data do not exist.

As we have discussed, according to the invention, the automatic monitor interval time change means sets optimum monitor interval time based on the current utilization factor and the length of the queue, whereby when the load of a subordinate network is high or the access load to the resources in the network management apparatus is high, the monitor interval time is prolonged for suppressing access from the network resource state monitor section; when the load of a subordinate network is low and the access load to the resources in the network management apparatus is low, the monitor interval time is shortened for promoting access from the network resource state monitor section. Since the load condition is grasped by grasping the network load according to the utilization factor and the communication load in the network management apparatus according to the queue length in combination, if the network load is not so high, but the communication load of the network management apparatus is high, automatically the management traffic is also suppressed, so that the essential application communication performance containing the network management apparatus can be prevented from lowering as much as possible.

Further, if the length of the transmission queue exceeds one length (maximum queue length), if the current monitor interval time exceeds the upper limit of the monitor interval time (maximum monitor interval time), or if the current utilization factor exceeds the upper limit of the utilization factor (maximum utilization factor), access from the network resource state monitor section is canceled; management traffic can also be suppressed urgently for a state in which loads occur like a burst, and network management for less affecting the essential application communication performance can be provided.

Also, if the length of the transmission queue exceeds one length (maximum queue length), if the current monitor interval time exceeds the upper limit of the monitor interval time (maximum monitor interval time), or if the current utilization factor exceeds the upper limit of the utilization factor (maximum utilization factor), in response to a network resource state inquiry from each manager node, the inquiring manager node is notified of an event indicating a high network load. The management traffic also containing the manager node in the high load state can be suppressed and the network management apparatus load condition and the subordinate load condition thereof can also be grasped in the manager node.

The inquiry totalization-means totalizes the network resource state inquiries from the manager nodes for each type and duplicate inquiry handling means handles duplicate inquiries at a time. The number of management traffic times for the resources associated with resource state inquiries from the manager nodes can be decreased while manager node requirements are satisfied.

The inquiry totalization means totalizes the network resource state inquiries from the manager nodes for each type and if the same inquiry is received from a manager node, the inquiry cache handling means returns the network resource state data previously accessed and stored in the cache buffer; furthermore the management traffic can be reduced and the response performance to the manager nodes can be improved.

What is claimed is:

1. A network management apparatus operating as a proxy agent in a network management system including a plurality of manager nodes and a proxy agent node for managing resources in a plurality of networks, said network management apparatus comprising:

resource state monitor means for accessing network resources periodically in cycles corresponding to a monitor interval time to monitor the network resources for a state of fault or change;

means for determining a current utilization factor based on an arrival factor of accessing the network resources and an average response time to access the network resources;

means for determining a length of a transmission queue for accessing the network resources, and automatic monitor interval time change means for calculating and automatically adjusting the monitor interval time based on the current utilization factor and the determined length of the transmission queue, wherein the monitor interval time will not cause a reduction in essential application communication performance.

2. The network management apparatus of claim 1, wherein when network resources are accessed every monitor interval time in said network management apparatus, if the length of the transmission queue exceeds a maximum queue length, if the current monitor interval time exceeds an upper limit of the monitor interval time (maximum monitor interval time), or if the current utilization factor exceeds an upper limit of the utilization factor (maximum utilization factor), said resource state monitor means cancels the resource access executed every monitor interval time.

3. The network management apparatus of claim 1, further comprising:

inquiry handling means for accepting a resource state inquiry from one of the manager nodes and returning a resource state in a subordinate network thereto, wherein when the resources are accessed, if the length of the transmission queue exceeds a maximum queue length, if the current monitor interval time exceeds an upper limit of the monitor interval time (maximum monitor interval time), or if the current utilization factor exceeds an upper limit of the utilization factor (maximum utilization factor), said inquiry handling means notifies the requesting manager node of an event indicating a high network load.

4. The network management apparatus of claim 2, further comprising:

inquiry handling means for accepting a resource state inquiry from one of the manager nodes and returning resource state data in a subordinate network thereto, wherein when the resources are accessed, if the length of the transmission queue exceeds said maximum queue length, if the current monitor interval time exceeds an upper limit of the monitor interval time (maximum monitor interval time), or if the current utilization factor exceeds an upper limit of the utilization factor (maximum utilization factor), said inquiry handling means notifies the requesting manager node of an event indicating a high network load.

5. A network management apparatus operating as a proxy agent in a network management system including a plurality of manager nodes and a proxy agent node for managing network resources, said network management apparatus comprising:

inquiry totalization means for periodically checking a reception queue for temporarily storing resource state inquiries from the manager nodes, and totalizing the inquiries stored in the reception queue for each type; and duplicate inquiry handling means for simultaneously processing duplicate inquiries.

6. A network management apparatus operating as a proxy agent in a network management system including a plurality of manager nodes and a proxy agent node for managing resources, said network management apparatus comprising:

inquiry totalization means for periodically checking a reception queue for temporarily storing resource state inquiries from the manager nodes, and totalizing the inquiries stored in the reception queue for each type; and inquiry cache handling means for holding resource state data provided by accessing the resources in a subordinate network in response to an inquiry in a cache buffer for each type of totalized inquiries for a fixed time period, wherein if a same inquiry is received from a manager node, said inquiry cache handling means returns the resource state data held in the cache buffer without accessing the network resources.

* * * * *